US008907660B2

(12) United States Patent
Cattin et al.

(10) Patent No.: US 8,907,660 B2

(45) Date of Patent: Dec. 9, 2014

(54) METHOD AND DEVICE FOR IDENTIFYING A SUBSET OF MEASUREMENTS, METHOD AND SYSTEM FOR LOCATING AN OBJECT, RECORDING MEDIUM FOR THESE METHODS

(75) Inventors: Viviane Cattin, Saint Egreve (FR); Suzanne Lesecq, Froges (FR); Nathalie Sprynski, Saint Pierre d'Allevard (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 344 days.

(21) Appl. No.: 13/518,668

(22) PCT Filed: Dec. 20, 2010

(86) PCT No.: PCT/EP2010/070317

§ 371 (c)(1), (2), (4) Date: Aug. 22, 2012

(87) PCT Pub. No.: WO2011/076767

PCT Pub. Date: Jun. 30, 2011

(65) Prior Publication Data

US 2012/0313626 A1 Dec. 13, 2012

(30) Foreign Application Priority Data

Dec. 22, 2009 (FR) ..................................... 09 59426

(51) Int. Cl.

*G01B 7/14* (2006.01)

*G01V 3/08* (2006.01)

(52) U.S. Cl.

CPC ..................................... *G01V 3/081* (2013.01)

USPC .................. 324/207.13; 324/207.15; 324/329

(58) Field of Classification Search

USPC ..................................................... 324/207.13

See application file for complete search history.

(56) References Cited

U.S. PATENT DOCUMENTS 6,147,480 A 11/2000 Osadchy et al.
6,373,240 B1 4/2002 Govari (Continued)

FOREIGN PATENT DOCUMENTS

EP 1887309 2/2008
FR 0953462 12/1947

(Continued)

OTHER PUBLICATIONS

S. Lesecq, S. Gentil, N. Daraoui "*Quadrator attitude estimation with data losses*", European Control Conference, ECC 09, Hungary (2009).

(Continued)

*Primary Examiner* — Bot Ledynh

(74) *Attorney, Agent, or Firm* — Occhiuti & Rohlicek LLP

(57) ABSTRACT

Identifying measurement subset comprising a disturbed measurement disturbed by a magnetic disturber includes emitting and measuring magnetic fields using mono-axial source/mono-axial transducer pairs to obtain real measurements distinguished by position of a source used to emit the field, position of transducer used to measure the field, and field frequency, a source being tied to a mobile object and the transducer tied to a frame of reference in which a position of the mobile object is to be expressed (or vice versa), estimating position of the object in the reference frame based on an observer and involving only a first subset of the measurements, estimating the measurements based at least in part on the estimated position Pi and on a direct model linking the object's position to the measurements, and determining whether or not the first measurement subset comprises a disturbed measurement by comparing the estimated and real measurements.

9 Claims, 2 Drawing Sheets

(56) References Cited

U.S. PATENT DOCUMENTS

| | | | |
|---|---|---|---|
| 6,528,989 | B1 | 3/2003 | Hansen |
| 7,292,948 | B2 | 11/2007 | Jones, Jr. et al. |
| 7,433,728 | B2 | 10/2008 | Govari |
| 2006/0122497 | A1 | 6/2006 | Glossop |
| 2008/0033282 | A1 | 2/2008 | Bar-Tal et al. |
| 2008/0125646 | A1 | 5/2008 | Govari et al. |
| 2009/0070063 | A1 | 3/2009 | Edelstein |

FOREIGN PATENT DOCUMENTS

| | | |
|---|---|---|
| WO | 00/23824 | 4/2000 |
| WO | 2006/054295 | 5/2006 |

OTHER PUBLICATIONS

S. Lesecq, S. Gentil, C. Berbra "Condition monitoring based on filter bank in the presence of data loss", Condition monitoring conference, CM2009/MFPT2009 (2009).

V. Sircoulond, G. Hobbs, H. Chafouk, J. Ragot, "*Evaluation de la qualité d'estimation en fonction de la perte de capteurs*" [*Evaluation of estimation quality as a function of the loss of sensors*], Diagnostic des systèmes complexes, Edition 2008, pp. 9 to 26.

J. Ragot, "*Validation et réconciliation des données, approche conventionnelle, difficultés et développement*" [*Validation and reconciliation of data, conventional approach, difficulties and development*], Les techniques de l'industrie minérale (2005) 29, pp. 22 to 30.

P.M. Frank, "*Fault Diagnosis in Dynamic Systems Using Analytical and Knowledge-based Redundancy—A Survey and Some New Results*," Automatica, vol. 26, No. 3, 1990.

R. Dixon, "*Observer-based FDIA: application to an electromechanical positioning system*," Control Engineering Practice, 12 (2004) 1113-1125.

Mark A. Nixon et al., "*The Effects of Metals and Interfering Fields on Electromagnetic trackers*," Presence, Vo. 7, No. 2, Apr. 1998, 204-218.

Joffrey Paille, "Spatial localization of surgical tools using electromagnetic tracking devices. Applications and validity domains of numerical modellings," Mar. 30, 1992, (Including English abstract on p. 150).

Tarentola, A., Siam (Ed.), "Inverse problem theory and methods for model parameter estimation", 2005.

Aster et al., Elsevier (Ed.), "Parameter estimation and inverse problems", vol. 90 in the International Geophysics Series, Elsevier, 2005.

METHOD AND DEVICE FOR IDENTIFYING A SUBSET OF MEASUREMENTS, METHOD AND SYSTEM FOR LOCATING AN OBJECT, RECORDING MEDIUM FOR THESE METHODS

CROSS-REFERENCE TO RELATED APPLICATIONS

This application is the National Stage of International Application No. PCT/EP2010/070317, filed on Dec. 20, 2010, which claims the benefit of the priority date of French Application No. 09594263, filed on Dec. 22, 2009. The content of these applications is hereby incorporated by reference in its entirety.

FIELD OF DISCLOSURE

The invention relates to a method and a device for identifying a subset of measurements comprising a measurement disturbed by a magnetic disturber. The invention also relates to a method and a system for locating an object in a frame of reference implementing the above method of identification. Finally, the invention also relates to a medium for recording information for the implementation of these methods.

BACKGROUND

A magnetic field disturber is here defined as being any object which alters or deforms a magnetic field emitted in proximity. For example, the disturber may be a conducting item. In this case, the alteration of the magnetic field is due to eddy current appearing in the conducting item. The conducting item is for example a metallic item. The disturber can also be a magnetic item such as a paramagnetic, ferromagnetic or diamagnetic item. In the case of ferromagnetic items, the alteration of the magnetic field is due to the fact that this item deforms the lines of the magnetic fields.

When a magnetic disturber is present in proximity to a magnetic field source and to a magnetic field transducer, the magnetic field measured by the transducer is different from that which would have been measured in the absence of this magnetic disturber. The measurement is then said to be "disturbed" by the magnetic disturber.

Here, the subsets of measurements comprising at least one measurement disturbed by a magnetic disturber are called "disturbed subset". Conversely, the subsets of measurements not comprising any measurement disturbed by a magnetic disturber are called "healthy subset" or "undisturbed subset".

Typically, the methods for identifying subsets disturbed by a magnetic disturber are used within methods for locating an object in a frame of reference.

Known methods for locating an object in a frame of reference comprise:

the emission of magnetic fields and the measurement of these magnetic fields with the aid of N monoaxial source/monoaxial transducer pairs so as to obtain a set of N real measurements, each real measurement of this set being obtained with the aid of a monoaxial source/monoaxial transducer pair being distinguished from the others by:

- the position of the monoaxial source used to emit the magnetic field, or
- the position of the monoaxial transducer used to measure the magnetic field emitted, or
- the frequency of the magnetic field.

the location of the object in the frame of reference on the basis of the measurements carried out by the monoaxial source/monoaxial transducer pairs.

A monoaxial source of magnetic field is a source which preferably emits the magnetic field along a single axis. For example, a coil whose turns are wound around one and the same axis is a monoaxial source of magnetic field and the preferential emission axis coincides with the winding axis of the turns.

In a similar manner, a monoaxial transducer is a transducer capable of measuring the projection of the magnetic field onto a single measurement axis.

Location of the object on the basis of magnetic fields exhibits numerous advantages. However, in practice, there exist numerous magnetic disturbers in the environment of the object which are liable to disturb the measurements of the magnetic field and therefore to falsify location of the object.

To correctly locate the object despite the presence of magnetic disturbers, it has already been proposed to use redundancy of the measurements. Indeed, given the short range of the magnetic disturbances, it might be expected that the presence of a magnetic disturber disturbs only a subset of the measurements. Thus, if the measurements are redundant, there often exists at least one undisturbed subset of measurements. To obtain redundancy of the measurements, the number N of monoaxial source/monoaxial transducer pairs is greater than the minimum number $N_{min}$ of measurements necessary to compute the position of the object in the frame of reference.

Thereafter, during location of the object, more weight can be given to the undisturbed measurements than to the disturbed measurements so as to obtain correct location of the object despite the presence of the magnetic disturber. For example, the position of the object is only computed on the basis of the undisturbed subset of measurements.

However, before this, it is necessary to implement a method for identifying the disturbed subset or subsets of measurements.

Hitherto, the determination of the disturbed subsets has been carried out during a prior calibration step (see for example patent application U.S. 2008/0033282). This prior calibration step comprises the construction of an estimation $P_i$ of the position of the object in the frame of reference on the basis of an observer $O_i$ involving only a subset $M_i$ of the N measurements.

The estimation $P_i$ is then compared with the known position of the object so as to determine whether or not the subset $M_i$ comprises disturbed measurements.

This method does not operate correctly if the magnetic disturber is present only intermittently or if it moves in the frame of reference. Moreover, recourse to a prior calibration step is irksome.

SUMMARY

The invention is aimed at remedying at least one of these drawbacks by proposing a simpler method for identifying a disturbed subset of measurements.

Its subject is therefore such a method comprising:

the estimation of the N measurements on the basis of the estimated position $P_i$ and of at least one direct model linking the position of the object to the set of N measurements, and the determination whether or not this subset of measurements comprises a disturbed measurement by comparing the estimated measurements with the real measurements.

In the method hereinabove, if the subset $M_i$ contains measurements disturbed by the magnetic disturber, then the estimation $P_i$ of the real position of the object is erroneous. Consequently, when the measurements which correspond to this erroneous position $P_i$ are estimated, the latter are very different from what is actually measured. This difference between the estimated measurements and the real measurements makes it possible to determine whether or not the subset $M_i$ is disturbed.

In order to be implemented, the method hereinabove does not require any prior calibration step during which the position of the object is known in advance.

Moreover, it may be repeated each time that the N measurements are renewed. Thus, this method operates even if the magnetic disturber is present only intermittently or if the disturbance created is modified in the course of time.

The embodiments of this identification method can comprise one or more of the following characteristics:

the method also comprises:

at least the construction of another estimation $P_i$ of the same position of the object in the frame of reference on the basis of an observer $O_j$ involving only a subset $M_j$ of the N measurements, where the subsets $M_j$ and $M_i$ have at least one measurement in common and differ from one another by at least one other measurement, the estimation of the N measurements on the basis of the estimated position $P_j$ and of the direct model linking the position of the object to the set of N measurements, the determination whether or not this subset $M_j$ contains disturbed measurements by comparing the estimated measurements with the real measurements, and the cross-checking of the information about the presence or the absence of disturbed measurements in the subsets $M_i$ and $M_j$ so as to more precisely pinpoint the disturbed measurement or measurements;

the method comprises:

the computation of at least one residual dependent on the difference between the estimated measurements and the real measurements, and the determination whether the subset comprises at least one disturbed measurement if this residual oversteps a predetermined threshold.

These embodiments of the identification method furthermore exhibit the following advantage:

the cross-checking of the information about several different subsets $M_i$ makes it possible to specify which measurement(s) is (are) disturbed by the magnetic disturber.

The subject of the invention is also a method for locating an object in a frame of reference. This method comprises:

the repetition of the execution of the method hereinabove for identifying a disturbed subset of measurements for several subsets NA of measurements from among the N real measurements until it finds at least one subset of measurements not comprising any disturbed measurements, and during the location of the object, only if a subset of measurements not comprising any disturbed measurements has been found, the weighting of measurements not belonging to this subset so as to limit their impact, with respect to the undisturbed measurements belonging to this subset, on the location of the object.

The embodiments of this method of location can comprise one or more of the following characteristics:

- if several subsets of measurements are identified as not comprising any disturbed measurements, then the method comprises the location of the object on the basis of a combination of the estimations $P_i$ of the same position, obtained on the basis of these subsets of measurements not comprising any disturbed measurements;
- the method comprises, during the location of the object, the replacement of at least one measurement identified as disturbed by an estimation of its undisturbed value obtained on the basis of a subset identified as not comprising any disturbed measurements.

These embodiments of the method of location furthermore exhibit the following advantages:

using a combination of the estimations $P_i$ obtained on the basis of several undisturbed subsets of measurements to construct the final estimation of the position of the object makes it possible to increase the precision of location of the object;

replacing the disturbed measurements by estimations of the undisturbed values of these measurements makes it possible to increase the precision of location of the object.

The subject of the invention is also a medium for recording information comprising instructions for the execution of one of the methods hereinabove, when these instructions are executed by an electronic computer.

The subject of the invention is also a device for identifying a subset comprising a measurement disturbed by a magnetic disturber. This device comprises:

N monoaxial source/monoaxial transducer pairs for obtaining a set of N real measurements, each real measurement of this set being obtained with the aid of a monoaxial source/monoaxial transducer pair being distinguished from the others by:

- the position of the monoaxial source used to emit the magnetic field, or
- the position of the monoaxial transducer used to measure the magnetic field, or
- the frequency of the magnetic field, at least one observer $O_i$ able to construct an estimation $P_i$ of the position of the object on the basis of only a subset $M_i$ of the N measurements, an estimator of the N measurements on the basis of the estimated position $P_i$ and of at least one direct model linking the position of the object to the set of N measurements, and a block able to determine whether or not the subset of measurements comprises a disturbed measurement by comparing the estimated measurements with the real measurements.

Finally, the subject of the invention is also a system for locating an object in a frame of reference. This system comprises:

N monoaxial source/monoaxial transducer pairs for obtaining a set of N real measurements, each real measurement of this set being obtained with the aid of a monoaxial source/monoaxial transducer pair being distinguished from the others by:

- the position of the monoaxial source used to emit the magnetic field, or
- the position of the monoaxial transducer used to measure the magnetic field, or
- the frequency of the magnetic field.

a module for locating the object in the frame of reference on the basis of the measurements carried out by the monoaxial source/monoaxial transducer pairs, the device hereinabove for identifying a subset of measurements comprising a disturbed measurement.

The location module is able:

- to use the identification device to find at least one subset of undisturbed measurements from among several subsets $M_i$ of measurements, and
- only if a subset of measurements not comprising any disturbed measurements has been found, to weight measurements not belonging to this subset so as to limit their impact, with respect to the undisturbed measurements belonging to this subset, on the location of the object.

BRIEF DESCRIPTION OF THE FIGURES

The invention will be better understood on reading the description which follows, given solely by way of nonlimiting example and while referring to the drawings in which.

In these figures, the same references are used to designate the same elements.

DETAILED DESCRIPTION

Hereinafter in this description, the characteristics and functions that are well known to the person skilled in the art are not described in detail.

Figure 1:
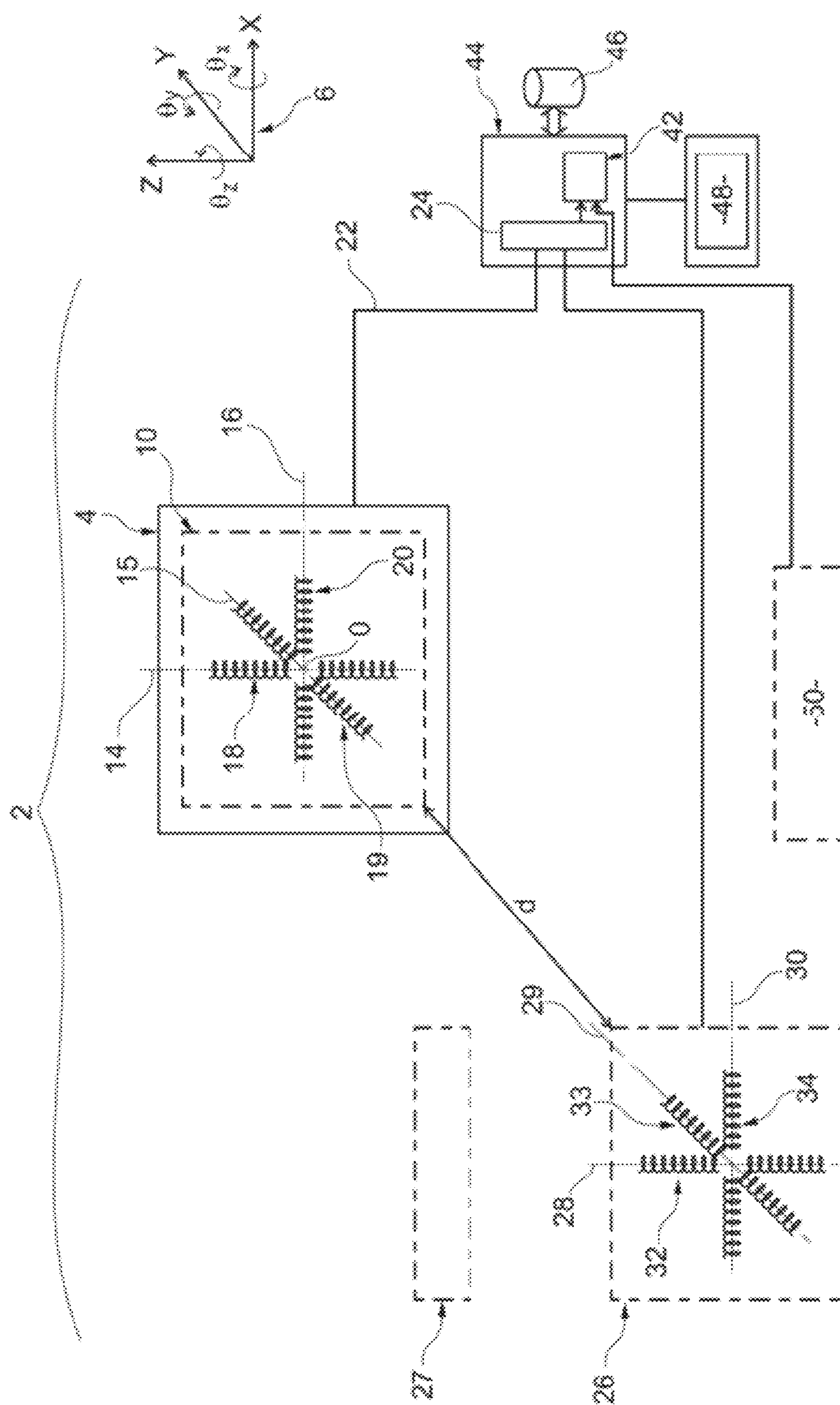
FIG. 1 is a schematic illustration of a system for locating an object in a frame of reference comprising a device for identifying a disturbed subset of measurements.

FIG. 1 represents a system 2 for locating an object 4 in a frame of reference 6. The object 4 is for example a probe or a catheter introduced into a human body. The object 4 is mobile in the frame of reference 6 with six degrees of freedom.

The frame of reference 6 is a fixed frame of reference exhibiting three orthogonal axes X, Y and Z.

Location of the object 4 in the frame of reference 6 consists in finding its position P. Here, the position P is tagged by coordinates x, y, z and $\theta_x$, $\theta_y$ and $\theta_z$. The coordinates x, y and z indicate the place of the object 4 in the frame of reference 6. The coordinates $\theta_x$, $\theta_y$ and $\theta_z$ indicate the angular orientation of the object 4 relative, respectively, to the axes X, Y and Z of the frame of reference 6.

To locate the object 4 in the frame of reference 6, it is for example equipped with a triaxial source 10 of magnetic field.

The source 10 is able to generate a magnetic field according to three non-collinear axes 14 to 16. Here, these axes 14 to 16 are mutually orthogonal. These axes are tied to the object 4.

For this purpose, the source 10 is here composed of three monoaxial sources 18 to 20. The monoaxial sources 18 to 20 emit, respectively, fields $B_{1j}$, $B_{2j}$ and $B_{3j}$ along the axes 14, 15 and 16. The index 1, 2 or 3 is an identifier of the monoaxial source and the index i is an identifier of the frequency $f_j$ of the magnetic field emitted by this monoaxial source.

Each of the monoaxial sources 18 to 20 may be modeled by a point source of magnetic field. Preferably, the monoaxial sources 18 to 20 are arranged in such a way that their respective point sources occupy exactly the same place in the frame of reference 6. Here this place is tagged by a point O. The point O is at the intersection of the axes 14 to 16.

For example, each monoaxial source 18 to 20 consists of a single coil wound around, respectively, the axes 14 to 16. Here, each of these coils is divided into two substantially identical groups of turns distributed in a symmetric manner on either side of the point O along the winding axis. Each group of turns is coiled in the same direction along the winding axis.

Each of these monoaxial sources 18 to 20 is connected up by way of a flexible wire-based link 22 to a processing unit 24.

The unit 24 is also connected up to two triaxial sensors 26 and 27 of magnetic field so as to have geometric redundancy of the measurements. These sensors 26 and 27 are spaced a distance d apart. For example, the sensors 26 and 27 are identical and only the sensor 26 is described and represented in detail.

The sensor 26 is fixed in the frame of reference 6. This sensor 26 is able to measure magnetic fields along three orthogonal axes 28 to 30. Here, the axes 28 to 30 are, respectively, parallel to the axes Z, Y and X of the frame of reference 6.

For this purpose, the sensor 26 incorporates three monoaxial transducers 32 to 34. Each of these transducers exhibits a direction of measurement along which its sensitivity to the magnetic field is a maximum. Here, the transducer 32, 33 and 34 measurement directions coincide, respectively, with the axes 28, 29 and 30.

For example, the transducers 32, 33 and 34 are coils wound, respectively, around the axes 28, 29 and 30.

The shortest distance d which separates each triaxial sensor 26 or 27 from the source 10 is at least three times larger than the greatest dimension of the source 10. The greatest dimension of the source 10 is the greatest length of one of the monoaxial sources 18 to 20. Under these conditions, the source 10 may be modeled as a magnetic dipole.

The association of a single monoaxial source and of a single monoaxial transducer that work at the same working frequency forms a monoaxial source/monoaxial transducer pair. For example, the monoaxial source 14 and the transducer 32 form a first monoaxial source/monoaxial transducer pair when they work at the frequency $f_1$ and a second monoaxial source/monoaxial transducer pair when they work at the frequency $f_2$. This same transducer 32 associated with the monoaxial source 15 forms a third and a fourth monoaxial source/monoaxial transducer pair when they work, respectively, at the frequencies $f_1$ and $f_2$.

Each monoaxial source/monoaxial transducer pair can work at a different frequency from that of the other pairs. However, here, solely by way of illustration only, it is assumed that each monoaxial source works only at the frequency $f_1$. There therefore exist eighteen monoaxial source/monoaxial transducer pairs. Each monoaxial source/monoaxial transducer pair corresponds to a measurement $ma_i$ of a physical quantity which is inherent thereto. The measurement $ma_i$ is the projection of the magnetic field emitted by the monoaxial source on the measurement axis of the monoaxial transducer. The measurement $ma_i$ of each pair is independent of the measurement $ma_i$ of another pair in the sense that it is possible for a magnetic disturber to disturb one of these measurements but not the other.

In this embodiment, there therefore exist eighteen independent measurements $ma_1$ to $ma_{18}$ which may be carried out at the same time or sequentially. Preferably, these eighteen measurements $ma_1$ to $ma_{18}$ are carried out simultaneously and repeated at regular interludes. The regular interlude corresponds to a measurement interval. At each measurement interval, the eighteen measurements are renewed by the eighteen monoaxial source/monoaxial transducer pairs. For example, the measurement interval is equal to a sampling period for the signals of the monoaxial transducers.

The set of these eighteen measurements $ma_1$ to $ma_{18}$ is denoted M and the number of measurements in the set M is denoted N. Here, the description is given in the particular case where N is equal to eighteen.

The processing unit 24 supplies the source 10 with AC current so as to generate the magnetic fields $B_{i1}$ and acquires the magnetic fields measured by the transducers 32 to 34 of the sensors 26 and 27.

For example, the unit 24 is a synchronous detector. An example of such a synchronous detector is described with regard to FIG. 16 of U.S. Pat. No. 6,528,989. Thus, the unit 24 will not be described here in greater detail.

The unit 24 is connected up to a module 42 for identifying disturbed subsets of measurements and for locating the object 4 in the frame of reference 6.

For example, the unit 24 takes the form of an electronic card while the module 42 takes the form of a software module. For this purpose, the system 2 comprises a programmable electronic computer 44 incorporating the unit 24 and able to execute instructions recorded on an information recording medium. For this purpose, the computer 44 is connected up to a memory 46 containing instructions for the execution of the method of FIG. 3 when they are executed by the computer 44. The computer 44 is also connected up to a man-machine interface 48. For example, the man-machine interface comprises a screen on which is represented the position of the object 4 in the frame of reference 6.

The system 2 can also comprise other apparatuses for measuring physical quantities, other than magnetic fields, representative of the position of the object 4 in the frame of reference 6. For example, the system 2 comprises an apparatus 50 such as a radiography apparatus or a camera. The measurements of the apparatus 50 are insensitive to the presence or to the absence of a magnetic disturber.

Figure 2:
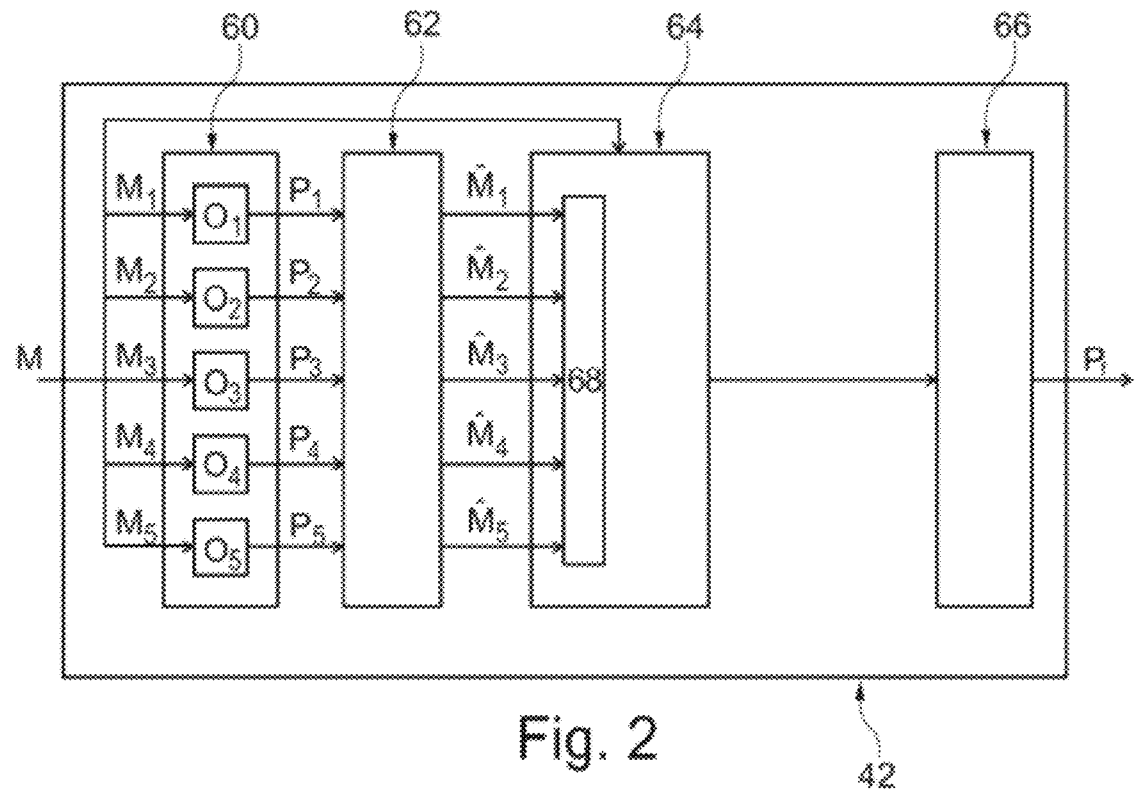
FIG. 2 is a schematic illustration of an object locator used in the system of FIG. 1.

FIG. 2 represents in greater detail an exemplary embodiment of the module 42.

The module 42 comprises in succession:

a bank 60 of observers $O_i$, an estimator 62 of the measurements, a block 64 for determining disturbed subsets $M_i$ of measurements, and a locator 66 of the position of the object 4 in the frame of reference 6.

At each measurement interval, the module 42 receives as input the N measurements of the set M. This set M is transmitted as input to the bank 60 of observers.

Each observer $O_i$ is able to solve a system of equations so as to obtain an estimation $P_i$ of the position of the object 4 in the frame of reference 6. Each observer $O_i$ uses for this purpose solely a subset $M_i$ of the measurements $ma_1$ to $ma_{18}$. The subset $M_i$ contains R measurements chosen in the set M, where R is an integer number strictly less than N and greater than or equal to a threshold $N_{min}$. The threshold $N_{min}$ is the minimum number of measurements necessary to estimate the position of the object 4 in the frame of reference 6. Here, given that the position of the object 4 is determined by six coordinates, x, y, z, $\theta_x$, $\theta_y$ and $\theta_z$ the value of the threshold $N_{min}$ is equal to eight.

The system of equations of an observer $O_i$ is for example obtained by modeling the magnetic interactions between the monoaxial sources and the monoaxial transducers used to carry out the R measurements of the subset $M_i$ without taking account of the presence of magnetic disturbers. In this system of equations, the coordinates x, y, z, $\theta_x$, $\theta_y$ and $\theta_z$ of the object 4 are the unknowns.

Information about the construction of the observers may be found in the following documents:

Tarentola, A. Siam (Ed.), "Inverse problem theory", 2005,

Aster Elsevier (Ed.) "Parameter estimation and inverse problems", Elsevier, 2005

Here, preferably, this system of equations may be written in the form of a Kalman filter.

The observers $O_i$ are chosen so as to maximize the probability that one of these observers uses solely an undisturbed subset $M_i$ of measurements.

For example, in this embodiment, five observers $O_1$ to $O_5$ are incorporated into the bank 60 of observers.

The observer $O_1$ uses solely the measurements of the triaxial sensor 26. The subset $M_1$ therefore comprises only nine measurements $ma_i$. This subset $M_1$ of measurements is not disturbed if the magnetic disturber affects only the measurements of the sensor 27.

The observer $O_2$ uses only the measurements carried out by the sensor 27. The measurement subset $M_2$ therefore comprises only nine measurements $ma_i$. This subset $M_2$ is not disturbed if the magnetic disturber affects only the measurements of the sensor 26.

The observers $O_3$, $O_4$ and $O_5$ use only the measurements carried out by, respectively:

the transducers 33 and 34 of the sensors 26 and 27, the transducers 32 and 34 of the sensors 26 and 27, and the transducers 32 and 33 of the sensors 26 and 27.

The subsets $M_3$, $M_4$ and $M_5$ therefore each comprise twelve measurements $ma_i$. These subsets $M_3$, $M_4$ and $M_5$ do not comprise any disturbed measurement if the magnetic disturber affects only the measurements carried out, respectively, with the transducers 32, 33 and 34. Stated otherwise, if the magnetic disturber affects solely the magnetic fields parallel to one of the directions X, Y or Z, then at least two of the subsets $M_3$, $M_4$ and $M_5$ are healthy.

The estimator 62 constructs a set $\hat{M}_i$ containing N estimations $\hat{m}a_{1i}$ to $\hat{m}a_{18i}$ of the real measurements carried out by each of the monoaxial source/monoaxial transducer pairs of the system 2 for an object placed in the estimated position $P_i$. In the notation $\hat{m}a_{ji}$, j is an identifier of the measurement and i is an identifier of the subset of measurements $M_i$ that is used to obtain the estimation $P_i$. Here the index j lies between 1 and 18.

Typically, the estimator 62 solves a system of equations which links the six coordinates of the position P of the object 4 to the N estimations $\hat{m}a_{1i}$ to $\hat{m}a_{18i}$. This system of equations is for example obtained by modeling the magnetic interactions between each of the monoaxial sources and each of the monoaxial transducers of the system 2 without taking account, for example, of the possible presence of a magnetic disturber. This system of equations is a direct model which makes it possible to solve the direct problem, that is to say the problem consisting in determining the value of the measurements which correspond to a given position of the object 4.

The block 64 determines whether or not the subset of measurements $M_i$ is disturbed. For this purpose, it comprises a comparator 68 able to compare the estimations $\hat{m}a_{ji}$ with the real measurements $ma_j$.

Here, the comparisons of the estimated measurements $\hat{m}a_{ji}$ with the real measurements $ma_j$ are carried out by using a set $R_i$ of residuals $R_{ji}$ for each observer $O_i$ and a decision criterion $C_i$ for each observer $O_i$.

The residuals $R_{ij}$ are for example equal to the difference between the estimated measurement $\hat{m}a_{ji}$ and the corresponding real measurement $ma_j$.

The decision criterion $C_i$ is here equal to the difference between an average $M\_d_i$ and an average $M\_u_i$.

The average $M\_d_i$ is the average of the residuals $R_{ji}$ obtained for the measurements discarded by the observer $O_i$. The discarded measurements are the measurements which do not belong to the subset $M_i$.

The average $M\_u_i$ is the average of the residuals obtained for the measurements used by the observer $O_i$. The measurements used are the measurements which belong to the subset $M_i$.

The locator 66 delivers a final estimation $P_f$ of the position of the object 4. This estimation is obtained by giving more significant weight to the undisturbed subsets $M_i$ relative to the disturbed subsets.

Figure 3:
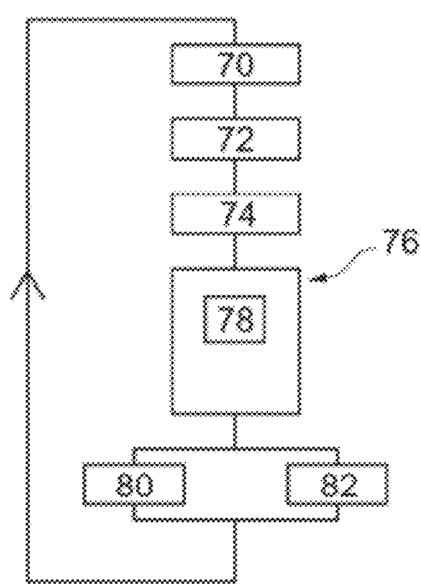
FIG. 3 is a flowchart of a method for locating an object in the system of FIG. 1.

The various elements of the module 42 and their manners of operation are described in greater detail with regard to FIG. 3.

The association of the triaxial source 10, of the triaxial sensors 26 and 27, of the unit 24, of the bank 60 of observers, of the estimator 62 and of the block 64 forms a device for identifying a subset disturbed by a magnetic disturber.

The operation of the system 2 will now be described with regard to the method of FIG. 3.

Initially, at each measurement interval, during a step 70, the N real measurements $ma_j$ are carried out by each of the mono-axial source/monoaxial transducer pairs of the system 2.

Thereafter, during a step 72, these measurements are transmitted as input to the bank 60 of observers. On the basis of these measurements, during step 72, each observer $O_i$ constructs an estimation $P_i$ of the position of the object 4 on the basis of the subset $M_i$ of measurements which corresponds to it. Thus, on completion of step 72, five estimations Rare constructed by the bank 60 of observers.

During a step 74, the sets $\hat{M}_i$ are constructed on the basis of the estimations P. For this purpose, each estimation $P_i$ is introduced into the estimator 62 so as to obtain the corresponding set $\hat{M}_i$ of estimations $\hat{m}a_{1i}$ to $\hat{m}a_{18i}$ of the N real measurements.

On completion of step 74, five sets $\hat{M}_i$ are obtained.

Thereafter, during a step 76, the block 64 determines whether or not the subsets $M_i$ are disturbed. For this purpose, during an operation 78, for each subset $\hat{M}_i$, the comparator 68 compares each estimated measurement $\hat{m}a_{ji}$ with the corresponding real measurement $ma_j$ measured during the same measurement interval.

More precisely, for each subset $\hat{M}_i$, the comparator 68 computes the residuals $R_{ji}$. Thereafter, it computes the averages $M\_d_i$ and $M\_u_i$. Finally, the decision criterion $C_i$ is computed.

If only the discarded measurements are disturbed then the average $M\_d_i$ has a high value while conversely the average $M\_u_i$ has a low value. Consequently, the difference between the averages $M\_d_i$ and $M\_u_i$ is significant. The value of the decision criterion $C_i$ is therefore large in this case. A significant value of the criterion $C_i$ therefore indicates that there exist disturbed measurements but that the latter do not belong to the subset $M_i$.

If the discarded measurements and the measurements used are both disturbed or if no measurement is disturbed then the discrepancy between the averages $M\_d_i$ and $M\_u_i$ is less than in the previous case. In this case, the criterion $C_i$ is smaller.

Thus, during the operation 78, the criterion $C_i$ is compared with a predetermined threshold $S_1$. If the value of the criterion $C_i$ exceeds this threshold $S_1$ then the subset $M_i$ identified as being a healthy subset.

Conversely, if the criterion $C_i$ is below the threshold $S_1$ then an additional comparison is undertaken so as to discriminate between the case where all the measurements are disturbed and the case where none of the measurements is disturbed. For example, this additional comparison consists in comparing the average $M\_d_i$ with a predetermined threshold $S_2$. If the average $M\_d_i$ is below this threshold $S_2$ then this signifies that no measurement is disturbed. The subset $M_1$ as well as the set of the other subsets are therefore healthy. In the converse case, this signifies that all the subsets $M_1$ are disturbed.

Thereafter, during a step 80, the disturbance produced by the magnetic disturber is characterized more precisely. Accordingly, the information about the various subsets $M_i$ that was obtained during step 76 is cross-checked so as to more precisely pinpoint which measurement or measurements is or are disturbed.

For example, if the subset $M_1$ is healthy whereas the subset $M_2$ is disturbed, this signifies that the magnetic disturber is close to the sensor 27. Moreover, if the measurement subset $M_3$ is not disturbed, this signifies that only the transducer 32 of the sensor 27 is disturbed by this magnetic disturber.

In another example, the subset $M_3$ is healthy. This signifies that the magnetic disturber disturbs solely the measurements along the direction Z. If moreover the subsets $M_1$ and $M_2$ are both disturbed then this signifies that the transducer 32 of the sensors 26 and 27 are the only transducers affected by the magnetic disturber.

In parallel with step 80 during a step 82, the locator 66 establishes the final estimation $P_f$ of the position of the object 4 by weighting the disturbed measurements so as to limit their impact on the precision of location of the object 4.

Various estimation schemes are usable during this step. For example, if it has been determined that no magnetic disturber exists, then an observer $O_t$ linking the set of N measurements of the set M to the estimation $P_1$ is used.

If it has been determined that there exists a disturber and at least one undisturbed subset of measurements, then the subset $M_i$ corresponding to the maximum value of the criterion $C_i$ is selected. Thereafter, the estimation $P_f$ may be taken equal to the estimation $P_i$ constructed by the observer $O_i$ during step 72.

Another solution consists in compensating for the disturbed measurements. Accordingly, the complete observer $O_t$ linking the N measurements to the final estimation $P_f$ is used. In this complete model, the unknowns are the measurements $ma_j$. The measurements $ma_j$ of the healthy subset $M_i$ are used directly by the complete observer $O_t$. On the other hand, the disturbed or potentially disturbed measurements which do not belong to the subset $M_i$ are replaced with an estimation of their undisturbed value. For example, this estimation is the estimation $\hat{m}a_{ji}$ obtained on the basis of the measurements of the healthy subset $M_i$ during step 74. Thereafter, this combination of real measurements and of estimated measurements is used by the observer $O_t$ to obtain the estimation $P_f$.

If there exist several healthy subsets of measurements, it is also possible to combine the estimations $P_i$ of the position of the object 4, obtained on the basis of these various healthy subsets, so as to obtain the final estimation $P_f$. For example, it is assumed here that the subsets $M_k$ and $M_l$ of measurements are healthy. The final estimation $P_f$ can then be obtained with the aid of the following relation: $P_f=\alpha P_k+(1-\alpha)P_l$, where $\alpha$ is a weighting coefficient. Typically, the coefficient $\alpha$ is given by the following relation: $\alpha=e_k/(e_k+e_l)$, where $e_k$ and $e_l$ are representative of the errors between the real position of the object 4 and, respectively, the estimations $P_k$ and $P_l$ of the position of the object 4.

For example, the errors $e_l$ and $e_k$ are computed on the basis of the difference between the estimated measurements $\hat{m}a_{ji}$ and the corresponding real measurements $ma_j$. For example, in a very simplified case, the errors $e_k$ and $e_l$ are taken equal, respectively, to the averages $M\_u_k$ and $M\_u_l$.

Steps 70 to 82 are repeated at each measurement interval. Thus, it is possible to identify the presence of an intermittent disturber and to adapt in real time the computations of the estimation $P_f$ so as to take account thereof.

Numerous other embodiments are possible. For example, the observers $O_i$ may be constructed in a different way. The observers $O_i$ may be obtained on the basis of a single model linking the six coordinates of the position of the object 4 to the eighteen measurements of the set N. Thereafter, the system of equations of each observer $O_i$ is obtained by ignoring in this model the measurements which do not form part of the subset $M_i$. For example, one way of ignoring these measurements consists in considering that the uncertainty in the measurements which do not belong to the subset $M_i$ are much much greater than the uncertainties in the measurements which belong to the subset $M_i$. More information about such schemes for constructing the observers $O_i$ may be found in the following articles:

S. Lesecq, S. Gentil, N. Daraoui "*Quadrator attitude estimation with data losses*", European Control Conference, ECC 09, Hungary (2009)

S. Lesecq, S. Gentil, C. Berbra "Condition monitoring based on filter bank in the presence of data loss", Condition monitoring conference, CM2009/MFPT2009 (2009).

It is also possible to use other schemes for computing residuals and other decision criteria. For example, other schemes are given in the following articles:

V. Sircoulond, G. Hoblos, H. Chafouk, J. Ragot, "*Evaluation de la qualité d'estimation en fonction de la perte de capteurs*" [Evaluation of estimation quality as a function of the loss of sensors], Diagnostic des systèmes complexes, Edition 2008, pages 9 to 26.

J. Ragot, "*Validation et réconciliation des données, approche conventionnelle, difficultés et developpement*" [Validation and reconciliation of data, conventional approach, difficulties and development], Les techniques de l'industrie minérale (2006) 29, pages 22 to 30.

As a variant, the system of equations of the direct model takes account of the presence of one or more disturbers of which, for example, the positions are known.

The method of FIG. 3 may be preceded by a step of detecting the disturbed measurements such as is described in patent application FR 0 953 462.

What has been described above applies also to systems for locating the object 4 in a frame of reference with one or two dimensions. Likewise, the system 2 may be simplified if it is not desired to measure the place or the angular orientation of the object 4 or if the object 4 possesses fewer degrees of freedom. In these cases, the number of monoaxial source/monoaxial transducer pairs may be reduced. Moreover, the observers and the estimators are simplified accordingly.

The number of sensors and of triaxial sources may be modified. For example, in another embodiment, the system 2 comprises only one triaxial sensor and one triaxial source. A triaxial sensor and a triaxial source correspond to nine subsets $M_i$ of eight measurements each. It is also possible to increase the number of sensors or of monoaxial sources. For example, in a particular embodiment, the system 2 comprises three triaxial sensors and a triaxial source thereby making it possible to obtain twenty-seven subsets M; of measurements.

It is also possible to increase the number of monoaxial source/monoaxial transducer pairs by making one or more of these pairs work at several different frequencies. For example, each pair works at two frequencies $f_1$ and $f_2$.

The magnetic fields may be emitted in a continuous manner, in a pulsed manner or a periodic manner.

The location and detection of disturbers have been described in the particular case where it is the object 4 which is mobile with respect to a fixed frame of reference 6. What has been described above applies also to the inverse situation where it is the object 4 which is fixed and the frame of reference 6 which is mobile. In this case, the object 4 is fixed and it is the monoaxial transducers which move with respect to the object 4.

It is also possible to invert the position of the sources and sensors. For example, one or more triaxial sensors of magnetic field are integrated into the object 4 and one or more triaxial sources are fixed without any degree of freedom to the frame of reference 6.

When a disturber is detected, it is possible for the disturbed measurements to be substituted with measurements obtained on the basis of the apparatus 50 or for measurements obtained on the basis of the apparatus 50 to be taken into account in addition.

The orientation of the object to be located may be defined by some other scheme such as Euler angles or quaternions.

What has been described does not apply solely to the medical sector but conversely to any sector where it is necessary to detect a disturber or to locate an object by using magnetic fields.

The invention claimed is:

1. A method for identifying a subset of measurements comprising a disturbed measurement, said disturbed measurement being disturbed by a magnetic disturber, said method comprising emitting magnetic fields and measuring said magnetic fields with the aid of N mono-axial source/mono-axial transducer pairs so as to obtain a set of N real measurements, each real measurement of said set being distinguished from other real measurements of said set by at least one of position of a mono-axial source used to emit said magnetic field, position of a mono-axial transducer used to measure said magnetic field, and frequency of said magnetic field, one of said mono-axial source and said mono-axial transducer being tied to a mobile object and an other of said mono-axial source and said mono-axial transducer being tied to a frame of reference in which a position of said mobile object is to be expressed, constructing an estimated position Pi of said mobile object in said frame of reference based at least in part on an observer Oi and involving only a first subset Mi of said N real measurements, estimating said N real measurements based at least in part on said estimated position Pi and on at least one direct model linking said position of said mobile object to said set of N real measurements, and determining whether or not said first subset Mi of said N real measurements comprises a disturbed measurement by comparing said estimated measurements with said real measurements.

2. The method of claim 1, further comprising constructing another estimate of said position of said mobile object in said frame of reference on the basis of another observer Oj involving only a second subset Mj of said N real measurements, wherein said first and second subsets Mj and Mi have at least one measurement in common and differ from one another by at least one other measurement, estimating said N real measurements on the basis of another estimated position Pj and of said direct model linking said position of the object to the set of N real measurements, determining whether or not said second subset Mj comprises a disturbed measurement by comparing said estimated measurements and said real measurements, and cross-checking information about the presence or the absence of disturbed measurements in the subsets Mi and Mj so as to more precisely pinpoint said disturbed measurement.

3. The method of claim 1, wherein determining whether or not the subset Mi comprises a disturbed measurement comprises computing at least one residual dependent on a difference between said estimated measurements and the said measurements, and if said residual oversteps a predetermined threshold, determining whether said first subset comprises at least one disturbed measurement.

4. A method for locating an object in a frame of reference, said method comprising emitting magnetic fields and measuring said magnetic fields with the aid of N mono-axial source/mono-axial transducer pairs so as to obtain a set of N real measurements, each real measurement of the set being distinguished from the other real measurements of the set by at least one of position of a mono-axial source used to emit the magnetic field, position of a mono-axial transducer used to measure the magnetic field emitted, and frequency of the magnetic field, locating the object in the frame of reference on the basis of the measurements carried out by the mono-axial source/mono-axial transducer pairs, repeatedly executing a method for identifying a subset of measurements comprising disturbed measurements as recited in claim 1 for several subsets Mi of measurements from among the N real measurements until at least one subset of measurements free of disturbed measurements is identified, and during location of the object, only if a subset of measurements free of disturbed measurements has been found, weighting measurements not belonging to the subset so as to limit the impact thereof, with respect to the undisturbed measurements belonging to this subset, on the location of the object.

5. The method of claim 4, wherein if several subsets of measurements are identified as free of disturbed measurements, locating the object on the basis of a combination of the estimates Pi of the same position obtained on the basis of the subsets of measurements free of disturbed measurements.

6. The method of claim 4, further comprising, during location of the object, replacing at least one measurement identified as disturbed by an estimate of an undisturbed value obtained on the basis of a subset identified as being free of disturbed measurements.

7. A tangible and non-transitory medium for recording information, said medium comprising instructions for causing an electronic computer to execute the method of claim 1.

8. An apparatus for identifying a subset of measurements comprising a measurement disturbed by a magnetic disturber, said apparatus comprising N mono-axial source/mono-axial transducer pairs for obtaining a set of N real measurements, each real measurement of said set being obtained with the aid of a mono-axial source/mono-axial transducer pair distinguished from other mono-axial source/mono-axial transducer pairs by at least one of position of a mono-axial source used to emit the magnetic field, position of a mono-axial transducer used to measure the magnetic field, and frequency of the magnetic field, at least one observer Oi able to construct an estimate Pi of a position of an object on the basis of only a subset Mi of the N real measurements, an estimator for estimating said N real measurements based at least in part on said estimate of said position Pi and of at least one direct model linking said position of the object to said set of N real measurements, and a block configured to determine whether or not said subset of measurements comprises a disturbed measurement by comparing said estimated measurements with said real measurements.

9. A system for locating an object in a frame of reference, said system comprising N mono-axial source/mono-axial transducer pairs for obtaining a set of N real measurements, each real measurement of said set of real measurements being obtained with the aid of a mono-axial source/mono-axial transducer pair, said mono-axial source/mono-axial transducer pair being distinguished from other mono-axial source/mono-axial transducer pairs by at least one of position of a mono-axial source used to emit the magnetic field, position of a mono-axial transducer used to measure the magnetic field, and frequency of said magnetic field, a location module for locating said object in said frame of reference based at least in part on measurements carried out by said mono-axial source/mono-axial transducer pairs, an identifying device as recited in claim 8 for identifying a subset of measurements comprising a disturbed measurement, wherein said location module is configured to use said identifying device to find at least one subset of undisturbed measurements from among several subsets Mi of measurements, and only if at least one subset of undisturbed measurements is found, to weight measurements not belonging to said subset of undisturbed so as to limit impact thereof, with respect to said undisturbed measurements belonging to said subset, on said location of said object.

* * * * *